United States Patent
Roadley-Battin

(10) Patent No.: US 12,358,632 B2
(45) Date of Patent: Jul. 15, 2025

(54) AIRCRAFT ELECTRICAL SYSTEM

(71) Applicant: Hamilton Sundstrand Corporation, Charlotte, NC (US)

(72) Inventor: Jonathan Mark Roadley-Battin, Birmingham (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 14 days.

(21) Appl. No.: 18/463,808

(22) Filed: Sep. 8, 2023

(65) Prior Publication Data

US 2024/0083589 A1 Mar. 14, 2024

(30) Foreign Application Priority Data

Sep. 8, 2022 (EP) .................................... 22194702

(51) Int. Cl.
| | |
|---|---|
| *B64D 27/24* | (2024.01) |
| *B60L 50/00* | (2019.01) |
| *B64D 27/02* | (2006.01) |
| *B64D 31/00* | (2024.01) |
| *H02J 1/00* | (2006.01) |

(52) U.S. Cl.
CPC .............. *B64D 27/24* (2013.01); *B60L 50/00* (2019.02); *B64D 31/00* (2013.01); *H02J 1/00* (2013.01); *B60L 2200/10* (2013.01); *B60L 2210/30* (2013.01); *B64D 27/026* (2024.01); *B64D 2221/00* (2013.01)

(58) Field of Classification Search
CPC ...... B64D 27/24; B64D 31/00; B64D 27/026; B64D 2221/00; B60L 50/00; B60L 2200/10; B60L 2210/30; H02J 1/00

USPC ......................................................... 307/9.1
See application file for complete search history.

(56) References Cited

U.S. PATENT DOCUMENTS

| | | |
|---|---|---|
| 6,909,268 B2 | 6/2005 | Taghizadeh-Kaschani |
| 7,098,631 B2 | 8/2006 | Cohen |
| 7,479,774 B2 | 1/2009 | Wai et al. |
| 8,860,385 B2 | 10/2014 | Martinelli |
| 2012/0098553 A1 | 4/2012 | Karlsson et al. |
| 2016/0149404 A1 | 5/2016 | Karimi et al. |
| 2017/0085174 A1 | 3/2017 | Babazadeh |

(Continued)

FOREIGN PATENT DOCUMENTS

CA 3235086 A1 * 5/2023 .............. B60L 15/04

OTHER PUBLICATIONS

European Search Report for Application No. 22194702.1, mailed Feb. 24, 2023, 13 pages.

(Continued)

*Primary Examiner* — Hal Kaplan
(74) *Attorney, Agent, or Firm* — CANTOR COLBURN LLP

(57) ABSTRACT

A voltage converter for an aircraft electrical system includes an input power line configured to receive input electrical power, an output power line configured to supply output electrical power to aircraft loads, conversion circuitry, and a controller. The conversion circuitry is configured to convert the input electrical power to supply the output electrical power based on one or more control parameters. The controller is configured to receive data relating to the aircraft loads and modify at least one control parameter based on the data.

20 Claims, 1 Drawing Sheet

(56) References Cited

U.S. PATENT DOCUMENTS

2018/0039309 A1    2/2018   Johnson et al.

OTHER PUBLICATIONS

Mohamed Elshaer et al., "Smart Optimal Control of DC-DC Boost Converter for Intelligent PV Systems", Intelligent System Application to Power Systems (ISAP), 2011 16th International Conference on, IEEE, Sep. 25, 2011, pp. 1-6.

* cited by examiner

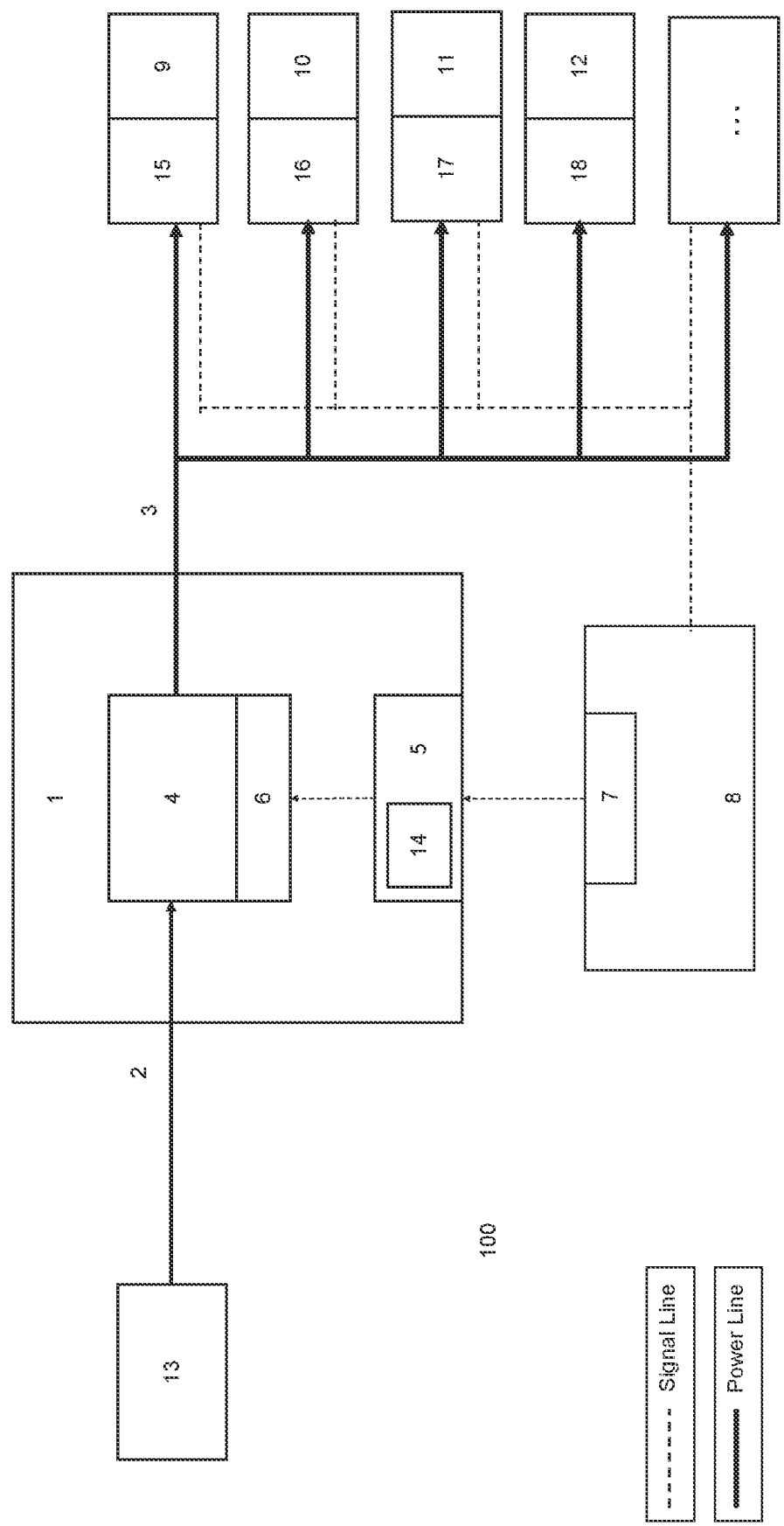

AIRCRAFT ELECTRICAL SYSTEM

CROSS REFERENCE TO RELATED APPLICATIONS

This application claims priority to European Patent Application No. 22194702.1 filed Sep. 8, 2022, the entire contents of which is incorporated herein by reference.

FIELD OF THE INVENTION

The invention relates to a voltage converter for an aircraft electrical system and an aircraft electrical system.

BACKGROUND

In aviation, hybrid electric aircraft are increasingly popular. A hybrid electric aircraft uses one or more electric fans to propel the aircraft. A hybrid electric aircraft uses batteries to power the fans as well as a generator which converts fuel to electrical power to power the fans. The generator generates alternating current (AC) electrical power. A converter is used to convert the AC electrical power output from the generator to direct current (DC) electrical power in order to drive the electric fans. For safety, a circuit breaker is provided on each electric fan in the event that a fault were to occur e.g. a short circuit. Opening a circuit breaker can change the bus characteristics which may significantly affect the operation of components of the system.

SUMMARY

In a first aspect, there is provided a voltage converter for an aircraft electrical system comprising an input power line configured to receive input electrical power, an output power line configured to supply output electrical power to aircraft loads, conversion circuitry, and a controller. The conversion circuitry is configured to convert the input electrical power to supply the output electrical power based on one or more control parameters. The controller is configured to receive data relating to the aircraft loads and modify at least one control parameter based on the data.

An aircraft electrical system can include a number of aircraft (electrical) loads. In order to supply electrical power to the aircraft loads, a converter is used. The converter can be tuned (e.g. programmed) to optimise the conversion (e.g. rectification) of the input power to the output power based on the aircraft loads, for example in a normal operating condition. However, in an event where the aircraft loads change, the voltage conversion may no longer be substantially optimised. In some circumstances, the voltage converter may output electrical power which is harmful to the aircraft loads. For example, this may be because the harmonic frequency of the voltage converter clashes with the harmonic frequency of the aircraft loads. In such circumstances, the applicant has recognised that by modifying the control parameters of the converter based on data relating to the aircraft loads, the output electrical power can meet the requirements of the aircraft loads, for example by ensuring the harmonic frequency of the converter does not clash with the harmonic frequency of the aircraft loads. The safety of aircraft electrical systems can thus be improved.

In some examples the aircraft loads comprise an electric propulsion load. In some examples the aircraft loads comprise one or more major loads, wherein each major load is a load which consumes at least 20% of the output electrical power. In some examples, the electric propulsion load is a major load. Electric propulsion loads are loads that are used to propel the aircraft. Such loads will consume a large proportion of the output electrical power, for example at least 20% of the output electrical power. In order to meet regulations and to maximise the efficiency of the propulsion loads, these loads need to be provided with an adequate supply of power. For example, when a propulsion load is supplied with a voltage, current and frequency that is tuned to work with the propulsion loads harmonic frequency, the propulsion load will efficiently convert the electrical power into propulsion as well as meet regulatory requirements. An efficient propulsion load may result in a more efficient aircraft, which is advantageous in particular to achieving sustainability targets. A propulsion load may be an important part of a hybrid electric aircraft. As such, it may be particularly important to optimise voltage conversion in a system comprising an electric propulsion load or a major load.

In some examples the aircraft loads comprise an ancillary load. In some examples the aircraft loads comprise one or more minor loads, wherein each minor load is a load which consumes no more than 20% of the output electrical power. In some examples, the ancillary load is a minor load. By providing ancillary loads on an aircraft electrical system, a significant number of services can be powered electrically.

In some examples the aircraft loads includes one or more of: a fan configured to propel the aircraft, a flight control surface (e.g. an aileron), or a heating system. In some examples the fan is an electric propulsion load. In some examples, the fan is a major load. In some examples the flight control surface or heating system is an ancillary load. In some example, the flight control surface or heating system is a minor load.

In some examples the data includes the state of the aircraft loads, wherein the state is either connected or disconnected. In some examples the data includes the state of the major loads and/or the minor loads, wherein the state is either connected or disconnected. In some examples, the state of a load is determined by the state of a circuit breaker. In some examples, the data comprises the state of one or more circuit breakers. Supplying data related to the state of the loads and/or the type of load can allow the voltage converter to substantially optimise the output electrical power to match the needs of the aircraft loads, for example by supplying the output electrical power at a voltage, current and frequency that is tuned to work with the propulsion loads harmonic frequency.

In some examples the controller is configured to determine the capacitance of the aircraft loads based on the data and modify at least one control parameter based on the determined capacitance. Some loads, for example propulsion loads and/or major loads, may be highly capacitive. Data relating to the state of the electric propulsion loads and/or the ancillary loads can thus be used to determine the capacitance of each load and thus the (overall) capacitance of the aircraft loads. The stability of the output electrical power is highly dependent on the capacitance of the aircraft loads. Therefore, aircraft loads that are predominantly capacitive may have a particularly significant effect on the stability of the output electrical power. The voltage converter can thus optimise the output electrical power based on the capacitance of the aircraft loads.

In some examples the at least one control parameters comprises at least one of a proportional constant value, an integral constant value, and/or a differential constant value. Using a Proportional-Integral-Derivative (PID) system may be an effective way of controlling the output electrical power. Any combination of the parameters (for example P, PI, PD, PID etc.) may make an effective control system. A voltage controller which uses a PID control system may be precisely controlled to optimise the output electrical power to meet the requirements of the aircraft loads.

In some examples the controller is further configured to determine the at least one control parameter by using the data and a lookup table. In some examples, the lookup table is stored in memory in the controller. The lookup table may be saved in a memory within the controller. The lookup table may be supplied to the controller in the data. The lookup table may contain (preferential) control parameters for each state of the aircraft loads. The lookup table may be compiled of predetermined experimental data for each state of the aircraft loads. The lookup table may be compiled of simulated data. The controller may determine from the lookup table which control parameters to select or modify based on the data, as well as which specific parameter values to use. This may be an effective way of determining the most optimised control parameters for each state of the aircraft loads. This may also ensure an unsafe control parameter (for example, a control parameter that may harm the aircraft loads) can be determined and not used. This may improve aircraft safety.

In some examples the input electrical power is an alternating current, and the conversion circuitry is configured to rectify the alternating current into direct current to convert the input electrical power to supply the output electrical power. In some examples the input electrical power is supplied by a generator. Rectifying alternating current into direct current to supply aircraft loads may be an important requirement for hybrid electric aircraft. The generator may have a harmonic frequency which may clash with the harmonic frequency of the aircraft electrical loads. The voltage converter may therefore use control parameters that substantially prevent harmful frequencies on the output power line. This may ensure that the voltage converter may supply the aircraft loads in an efficient and safe way.

In some examples the input electrical power is an input direct current, and the conversion circuitry is configured to regulate the input direct current to an output direct current to convert the input electrical power to supply the output electrical power. In some examples the input electrical power is supplied by a battery. Regulating direct current from a battery to output direct current to supply aircraft loads may be an important requirement for fully electric aircraft. The voltage converter may use control parameters that substantially optimise the power conversion (regulation). This may ensure that the voltage converter may supply the aircraft loads in an efficient and safe way.

In some examples the controller is configured to receive the data relating to the aircraft loads from a central computer of the aircraft electrical system.

In some examples the data relating to the aircraft loads comprises a state of a circuit breaker connected between one of the aircraft loads and the output power line, the circuit breaker configured to activate in the event of a failure of the respective aircraft load.

In a second aspect, there is provided an aircraft electrical system comprising the voltage converter of the first aspect.

In some examples a central computer is configured to produce the data relating to the aircraft loads and supply the data to the controller. A central computer may monitor each of the aircraft loads and record the state of the loads in the data. A central computer may monitor each of the aircraft loads and update the state of the loads in the data in response to a change in the state of the aircraft loads. A central computer may be an effective way of monitoring, recording and updating each of the aircraft loads and supplying the controller with this information.

In some examples the aircraft loads includes one or more of: a fan configured to propel the aircraft, a flight control surface (e.g. an aileron), or a heating system as mentioned in the first aspect. A fan may be an important part of a hybrid electric aircraft. A fan may be a propulsion load that is predominantly capacitive. A flight control surface or heating system may have a relatively lower capacitance or may only be active (consuming electrical power) for a relatively short period of time. By supplying data which includes the state of the fans, flight control surfaces, or heating systems, the controller can effectively modify the control parameters to output electrical power which is suitable for each of the these loads or a combination of these loads.

In some examples the fan is an electric propulsion load. In some examples, the fan is a major load. In some examples the flight control surface or heating system is an ancillary load. In some examples, the flight control surface or heating system is a minor load. In some examples, the data includes information relating to the major loads and the minor loads. In some examples, the data includes information relating to the electric propulsion loads and the ancillary loads.

In some examples the aircraft electrical system comprises one or more circuit breakers as mentioned in the first aspect, wherein each circuit breaker is connected between at least one aircraft load and the output power line, and is configured to break the connection between the respective aircraft load and the output power line when the circuit breaker is activated. A circuit breaker may be an important safety feature of a hybrid electric aircraft. A circuit breaker may be required by regulation. In some examples each circuit breaker is configured to activate in the event of a failure of the aircraft load that is connected to the circuit breaker. If the circuit breaker activates, the output power line may have a substantially instantaneous change in the load. Because the fan may be a predominantly capacitive load, the overall capacitance of the aircraft loads may change significantly substantially instantaneously. This may destabilise the voltage converter and the output power line. It may be advantageous to modify the control parameters in response to such circumstances.

In some examples the central computer is configured to record the state of each circuit breaker in the data. It may be advantageous for the voltage converter to modify at least one control parameter to stabilise and optimise the output power line in the event of a circuit breaker activating.

In a third aspect, there is provided a hybrid electric aircraft comprising the voltage converter of the first aspect or the aircraft electrical system of the second aspect.

In a fourth aspect, there is provided a method of controlling a voltage converter for an aircraft electrical system, the method comprising receiving input electrical power on an input power line; suppling output electrical power to aircraft loads on an output power line; converting the input electrical power using conversion circuitry to supply the output electrical power based on one or more control parameters; and receiving data relating to the aircraft loads and modifying at least one of the control parameters based on the said data.

The aircraft electrical system of the second aspect may comprise any of the features of the examples described with respect to the first aspect. The hybrid electric aircraft of the third aspect may comprise any of the features of the examples described with respect to the first and second aspects. The method of the fourth aspect may include any functional steps described in relation to the examples of the first to third aspects.

BRIEF DESCRIPTION OF THE DRAWINGS

Various examples will now be described with reference to the accompanying drawings in which:

The FIGURE shows a schematic representation of an aircraft electrical system.

DETAILED DESCRIPTION

With reference to the FIGURE, an aircraft electrical system 100 comprises a voltage converter 1, a power source 13, first, second, third and fourth aircraft loads 9, 10, 11, 12, first, second, third and fourth circuit breakers 15, 16, 17, 18, and a central computer 8.

The power source 13 is connected to an input power line 2 of the voltage converter 1 such that the power source 13 can supply input electrical power to the voltage converter 1. The input power line 2 accordingly receives the input electrical power supplied by the power source 13. The power source 13 is a generator which supplies alternating current (AC) electrical power. As such, the input electrical power has voltage, current and frequency components.

The first, second, third and fourth aircraft loads 9, 10, 11, 12 are connected to an output power line 3 of the voltage converter 1 such that the first, second, third and fourth aircraft loads 9, 10, 11, 12 receive output electrical power from the voltage converter 1. The output power line 3 accordingly supplies the output electrical power to the first, second, third and fourth aircraft loads 9, 10, 11, 12.

In this example, the first aircraft load 9 is a first electric fan which includes a power converter and an electric motor. The second aircraft load 10 is a second electric fan which includes a power converter and an electric motor. The impedance of the electric fans 9, 10 is predominantly capacitive due to the characteristics of the power converters which drive the electric fans 9, 10. The electric fans 9, 10 convert electrical power into a driving force (i.e. thrust) that is used to propel the aircraft. As such, the electric fans 9, 10 require a substantial amount of power in order to provide sufficient thrust to propel the aircraft. The electric fans 9, 10 are major aircraft loads. A major aircraft load consumes a significant portion of the output electrical power available on the output power line 3. For example, the electric fans 9, 10 each consume at least 20% of the power on the output power line 3. The electric fans 9, 10 are propulsion loads.

The third aircraft load 11 is an aircraft heating system, for example a wing de-icer. The third aircraft load 11 is predominantly resistive. The fourth aircraft load 12 is a flight control surface actuator and is actuated when the flight control surface is used. As such, the fourth aircraft load 12 is intermittent and may only have a negligible presence (i.e. draw a relatively small amount of power) on the output power line 3. The third and fourth aircraft loads 11, 12 are minor loads. A minor aircraft load consumes a significantly lower portion of the output electrical power available on the output power line 3 compared to a major load. For example, the third aircraft load 11 consumes no more than 20% of the power on the output power line 3.

The aircraft electrical system 100 comprises first, second, third and fourth circuit breakers 15, 16, 17, 18, one for each respective aircraft load 9, 10, 11, 12. The first circuit breaker 15 is connected between the output power line 3 and the first aircraft load 9. The second circuit breaker 16 is connected between the output power line 3 and the second aircraft load 10. The third circuit breaker 17 is connected between the output power line 3 and the third aircraft load 11. The fourth circuit breaker 18 is connected between the output power line 3 and the fourth aircraft load 12. Each circuit breaker 15, 16, 17, 18 is able to disconnect the respective aircraft load 9, 10, 11, 12 from the output power line 3. The circuit breakers 15, 16, 17, 18 can be activated individually. The circuit breakers 15, 16, 17, 18 can be activated manually.

The circuit breakers 15, 16, 17, 18 can be activated automatically in the event of a failure in the aircraft load 9, 10, 11, 12. A failure may be, for example, a short circuit which causes the aircraft load 9, 10, 11, 12 to draw substantially more current than the aircraft load's 9, 10, 11, 12 maximum rated current. In such an event, the circuit breaker connected to the failed aircraft load 9, 10, 11, 12 will activate by disconnecting the failed aircraft load 9, 10, 11, 12 from the output power line 3 and thus prevent current from flowing from the output power line 3 to the failed aircraft load 9, 10, 11, 12.

The present example uses the first, second, third and fourth aircraft loads 9, 10, 11, 12 and first, second, third and fourth circuit breakers 15, 16, 17, 18 as an example only and the number of loads or circuit breakers or the types of loads (e.g. major or minor loads) may be different in other examples.

The voltage converter 1 comprises conversion circuitry 4 and a controller 5. The conversion circuitry 4 converts the input electrical power to the output electrical power. In this example, the first, second, third and fourth aircraft loads 9, 10, 11, 12 require direct current electrical power. As such, the conversion circuitry 4 converts alternating current supplied by the power source 13 as input electrical power to direct current output electrical power, and comprises the appropriate circuitry configured for this purpose.

The conversion circuitry 4 converts the electrical power based on one or more control parameters 6. The control parameters 6 include one or more of a proportional control value, an integral control value, and a derivative control value. The conversion circuitry 4 is programmed to implement one or more control parameters which will result in a control system that can effectively and efficiently convert in the input electrical power to the output electrical power. For example, the conversion circuitry 4 may implement proportional-integral control parameters, resulting in a PI control system. Alternatively, the conversion circuitry 4 may implement proportional-derivative control parameters, resulting in a PD control system. Alternatively, the conversion circuitry 4 may implement proportional-integral-derivative control parameters, resulting in a PID control system.

Regardless of which control system the conversion circuitry 4 implements, the conversion circuitry is configured to convert the input electrical power to the output electrical power, in order to supply the first, second, third and fourth aircraft loads 9, 10, 11, 12 with a reliable and safe voltage, current and frequency as seen on the output electrical line, whilst also ensuring the output power line 3 meets all regulatory requirements.

The one or more control parameters 6 are control parameters that are used by the conversion circuitry 4 to achieve an effective and efficient conversion of the input electrical power to the output electrical power. The control parameters may, however, be effective only in a particular operating condition of the aircraft electrical system 100. If or when the operating condition changes, the control parameters 6 will also be required to change in order to maintain effective and efficient conversion.

The controller 5 modifies the control parameters 6, and thereby control the conversion circuitry 4, in order to maintain effective and efficient conversion, based on the operating condition. The controller 5 receives data 7 from a central computer 8 relating to the operating condition. The data 7 includes information relevant for the controller 5 to determine the most appropriate control parameters 6 to apply to the conversion circuitry 4.

The data 7 is compiled by the central computer 8. The central computer 8 monitors the overall aircraft electrical system 100, and in particular the state of the first, second, third and fourth aircraft loads 9, 10, 11, 12. This includes the state of the circuit breakers 15, 16 and the electric fans 9, 10. As such, if or when a load is connected or disconnected from the output electrical line 3 for any reason, the central computer 8 records the state and state change in the data 7 and supplies the data 7, along with any other relevant data (e.g. altitude, speed etc.), to the controller 5.

The controller 5 is configured for logic based decision making based on the data 7. The controller 5 has a memory 14 which stores a lookup table. The lookup table is a data set which includes information related to the aircraft electrical system 100, the states of the first, second, third and fourth aircraft loads 9, 10, 11, 12, and corresponding control parameters. The controller 5 can therefore select the most appropriate control parameter or parameters 6 to supply to the conversion circuitry 4 based on the data 7 and the lookup table stored in memory 14.

In an exemplary embodiment, a first set of control parameters 6 is determined based on the characteristics of the power source 13 and the characteristics of the first, second, third and fourth aircraft loads 9, 10, 11, 12. The first set of control parameters 6 is programmed into the voltage converter 1. The conversion circuitry 4 uses the first set of control parameters 6 in any conversion operation.

In this example, the conversion circuitry 4 uses a PI control system. As such, the conversion circuitry 4 relies on two parameters to implement the control system. The first parameter is the "P" value which relates to the proportional aspect of the control. The second parameter is the "I" value which relates to the integral aspect of the control. The P value and the I value is selected based on the voltage, current and frequency characteristics on the input power line 2, and the first, second, third and fourth aircraft loads 9, 10, 11, 12. The P value and the I value may be experimentally determined or determined through simulation.

The first set of control parameters 6 are programmed into the voltage converter 1, in software or firmware. State data relating to the operating condition of the aircraft electrical system 100 (for example, the state of the first, second, third and fourth aircraft loads 9, 10, 11, 12) is also stored in the voltage converter 1 which corresponds to the first set of control parameters 6. The aircraft electrical system 100 can thus use the first set of control parameters 6 in operating conditions when the first, second, third and fourth aircraft loads 9, 10, 11, 12 meet the requirements of state data. This is a normal operating condition.

In a normal operating condition, the power source 13 supplies AC electrical power on the input power line 2. The conversion circuitry 4 uses the control parameters 6 to rectify the AC input power to DC output power on the output power line 3. The first, second, third and fourth aircraft loads 9, 10, 11, 12 are connected to the output power line 3 and thus receive the power supplied by the output power line 3. The aircraft loads 9, 10 are electric fans which consume substantially the majority of the power supplied on the output line 3. The third and fourth aircraft loads 11, 12 are ancillary loads for services which consume substantially less power compared to the electric fans 9, 10.

The conversion circuit 4 uses control parameters 6 are which have been predetermined to ensure the conversion of the input electrical power to the output electrical power is as efficient as possible, and that it is effective in supplying a stable voltage and current to the output power line 3 when considering the frequency response of the first, second, third and fourth aircraft loads 9, 10, 11, 12. This includes taking into account the predominantly capacitive characteristic of the aircraft loads 9, 10 which includes the power converters which drive the electric fans 9, 10.

The central computer 8 monitors the aircraft electrical system 100 and records and updates the data 7 to maintain a log of the aircraft electrical system 100 status.

In the event of a failure of the electric fan 9 the circuit breaker 15 activates. This results in the electric fan 9 disconnecting from the output power line 3 substantially instantaneously. As a result, there is a sudden change in the aircraft load characteristics.

Specifically, because the power converter of the electric fan 9 has an impedance which is predominantly capacitive, the activation of the circuit breaker 15 causes a sudden drop of capacitance on the aircraft load. The sudden drop of capacitance on the aircraft load can cause the voltage converter 1, or more specifically the conversion circuitry 4, to destabilise. This could also result in the aircraft electrical system 100 destabilising.

The destabilising of the conversion circuitry 4 would happen as a result of the first set of control parameters 6 which are being used by the conversion circuitry 4 no longer being suitable for the operating conditions of the aircraft electrical system 100. If the first set of control parameters 6 were continued to be used, the voltage converter 1 would output electrical power on the output power line 3 with the voltage, current and frequency components of the output electrical power outside safe limits or not meeting regulatory requirements. This can happen, for example, in a case where the harmonic frequency of the AC power source is rectified in a manner which causes it to clash with the harmonic frequency of the aircraft loads.

To address this, when the circuit breaker 15 activates, the state change of the circuit breaker 15 and state data related to the electric fan 9 are recorded by the central computer 8 in the data 7. The data 7 is supplied to the controller 5.

The controller 5 receives the data 7 and makes appropriate decisions based on the received data 7. In this case, because there has been a sudden change in the aircraft load capacitance, the controller 5 modifies the control parameters 6.

The controller 5 may use the data 7 to determine the aircraft load capacitance and find a more suitable set of control parameters 6 from the lookup table which contains data relating to aircraft load capacitance and suitable control parameters. Alternatively, the controller 5 may use the state data of the aircraft electrical system 100 (which contains, for example, a binary value which represents the number of connected or disconnected loads) and use the lookup table to find a suitable set of control parameters for a given state. In both embodiments, the controller 5 identifies that the control parameters 6 need to be changed and makes the appropriate modifications.

The controller 5 thus modifies the control parameters 6 to a more suitable set of control parameters. This may include changing one control parameter, two control parameters, or loading an entirely new control system altogether. For example, the system may change the P value of a PD control system, or may change the PD system for a PI system.

When the new set of control parameters 6 is used by the conversion circuitry 4, the voltage converter 1 again supplies a stable and safe output electrical power on the output power line 3. A scenario in which an output power line becomes unsafe is thus averted.

In other examples, the power source 13 is a battery. In this example, the features of the first, second, third and fourth aircraft loads 9, 10, 11, 12, circuit breakers 15, 16, central computer 8, data 7, controller 5 and memory 14 are substantially the same as the first example. The power source 13, input power line 2, output power line 3 and the conversion circuitry 4 are different.

The battery supplies DC input electrical power on the input power line 2. The conversion circuitry 4 regulates the input electrical power to DC output electrical power. The conversion circuitry 4 supplies the DC output electrical power on the output power line 3, which is supplied to the first, second, third and fourth aircraft loads 9, 10, 11, 12.

In substantially the same manner as the first example, a first set of control parameters 6 is determined for a normal operating condition and used. In the event of a change in the characteristics of the first, second, third and fourth aircraft loads 9, 10, 11, 12 the central computer 8 updates the data 7 and supplies the data 7 to the controller 5. The controller 5 modifies the control parameters 6 in substantially the same way as the first example.

Accordingly, the voltage converter 1 is also suited to be configured for DC-DC voltage regulation, in which the benefits and advantages of the invention may still be realised.

Various aspects of the apparatus disclosed in the various embodiments may be used alone, in combination, or in a variety of arrangements not specifically discussed in the embodiments described in the foregoing and this disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A voltage converter for an aircraft electrical system, comprising:
an input power line configured to receive input electrical power;
an output power line configured to supply output electrical power to aircraft loads;
conversion circuitry; and
a controller;
wherein the conversion circuitry is configured to convert the input electrical power to supply the output electrical power based on one or more control parameters;
wherein the controller is configured to receive data relating to the aircraft loads and modify at least one control parameter based on the data;
wherein the controller is configured to receive the data relating to the aircraft loads from a central computer of the aircraft electrical system.

2. The voltage converter of claim 1, wherein the data includes the state of the aircraft loads, wherein the state is either connected or disconnected.

3. The voltage converter of claim 1, wherein the aircraft loads comprise an electric propulsion load.

4. The voltage converter of claim 1, wherein the aircraft loads comprise an ancillary load.

5. The voltage converter of claim 1, wherein the controller is configured to determine the capacitance of the aircraft loads based on the data and modify at least one control parameter based on the determined capacitance.

6. The voltage converter of claim 1, wherein the at least one control parameters comprises at least one of: a proportional constant value, an integral constant value, and a differential constant value.

7. The voltage converter of claim 1, wherein the controller is further configured to determine the at least one control parameter by using the data and a lookup table.

8. The voltage converter of claim 1, wherein the input electrical power is an alternating current supplied by a generator, and the conversion circuitry is configured to rectify the alternating current into direct current to convert the input electrical power to supply the output electrical power.

9. The voltage converter of claim 1, wherein the input electrical power is an input direct current supplied by a battery, and the conversion circuitry is configured to regulate the input direct current to an output direct current to convert the input electrical power to supply the output electrical power.

10. The voltage converter of claim 1, wherein the aircraft loads are one or more of: a fan configured to propel the aircraft, an flight control surface, and a heating system.

11. The voltage converter of claim 1, wherein the data relating to the aircraft loads comprises a state of a circuit breaker connected between one of the aircraft loads and the output power line, the circuit breaker configured to activate in the event of a failure of the respective aircraft load.

12. An aircraft electrical system comprising:
a voltage converter as claimed in claim 1.

13. A hybrid electric aircraft comprising:
an aircraft electrical system as claimed in claim 12.

14. A method of controlling a voltage converter for an aircraft electrical system, the method comprising:
receiving input electrical power on an input power line;
supplying output electrical power to aircraft loads on an output power line;
converting the input electrical power using conversion circuitry to supply the output electrical power based on one or more control parameters; and
receiving data relating to the aircraft loads and modifying at least one of the control parameters based on the said data;
wherein the data relating to the aircraft loads comprises a state of a circuit breaker connected between one of the aircraft loads and the output power line, the circuit breaker configured to activate in the event of a failure of the respective aircraft load.

15. A voltage converter for an aircraft electrical system, comprising:
an input power line configured to receive input electrical power;
an output power line configured to supply output electrical power to aircraft loads;
conversion circuitry; and
a controller;
wherein the conversion circuitry is configured to convert the input electrical power to supply the output electrical power based on one or more control parameters;
wherein the controller is configured to receive data relating to the aircraft loads and modify at least one control parameter based on the data;

wherein the controller is configured to determine the capacitance of the aircraft loads based on the data and modify at least one control parameter based on the determined capacitance.

16. An aircraft electrical system comprising:
a voltage converter as claimed in claim 15.

17. A hybrid electric aircraft comprising:
an aircraft electrical system as claimed in claim 15.

18. The voltage converter of claim 15, wherein the data includes the state of the aircraft loads, wherein the state is either connected or disconnected.

19. The voltage converter of claim 18, wherein the aircraft loads comprise an electric propulsion load.

20. The voltage converter of claim 15, wherein the aircraft loads comprise an ancillary load.

* * * * *